UNITED STATES PATENT OFFICE.

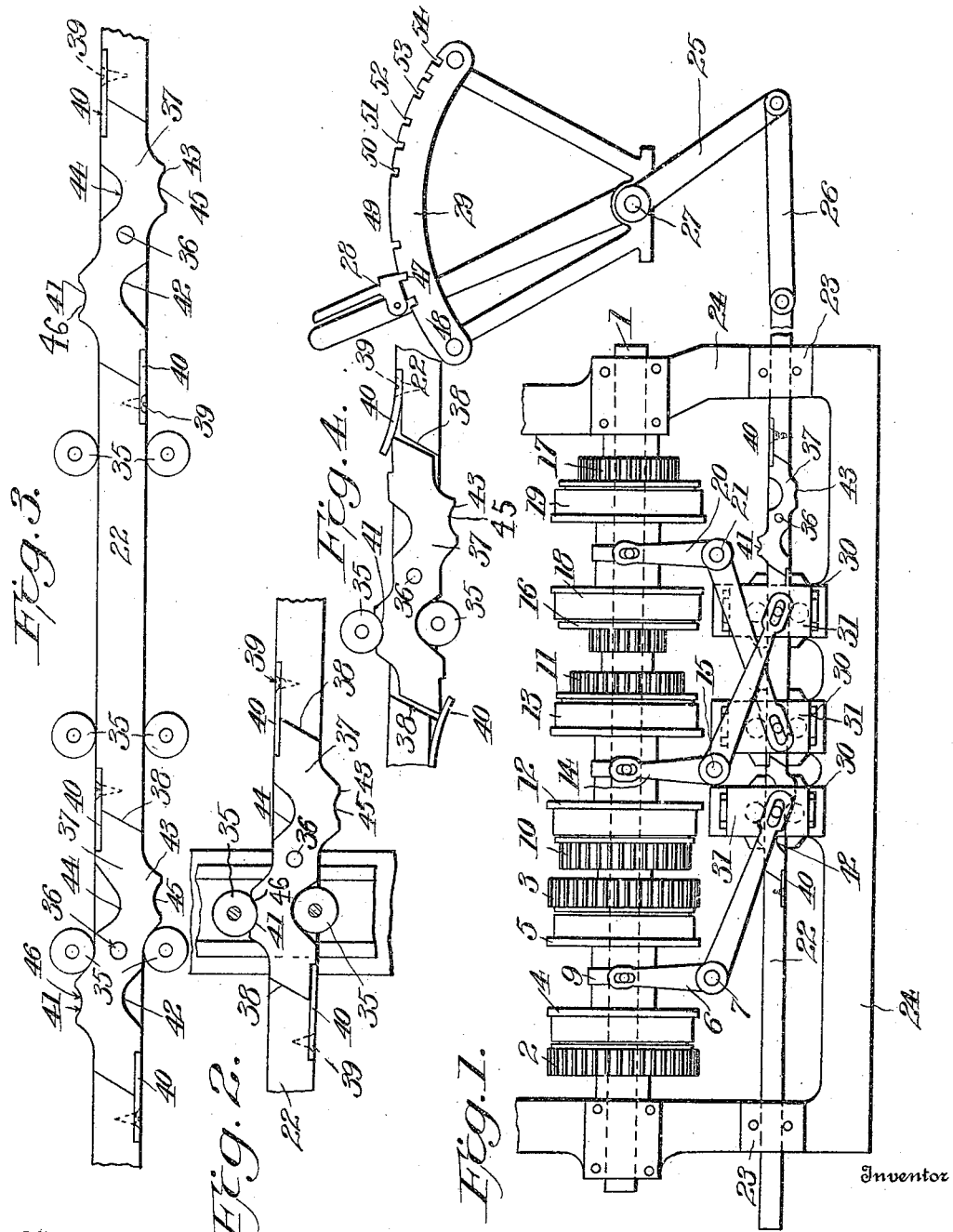

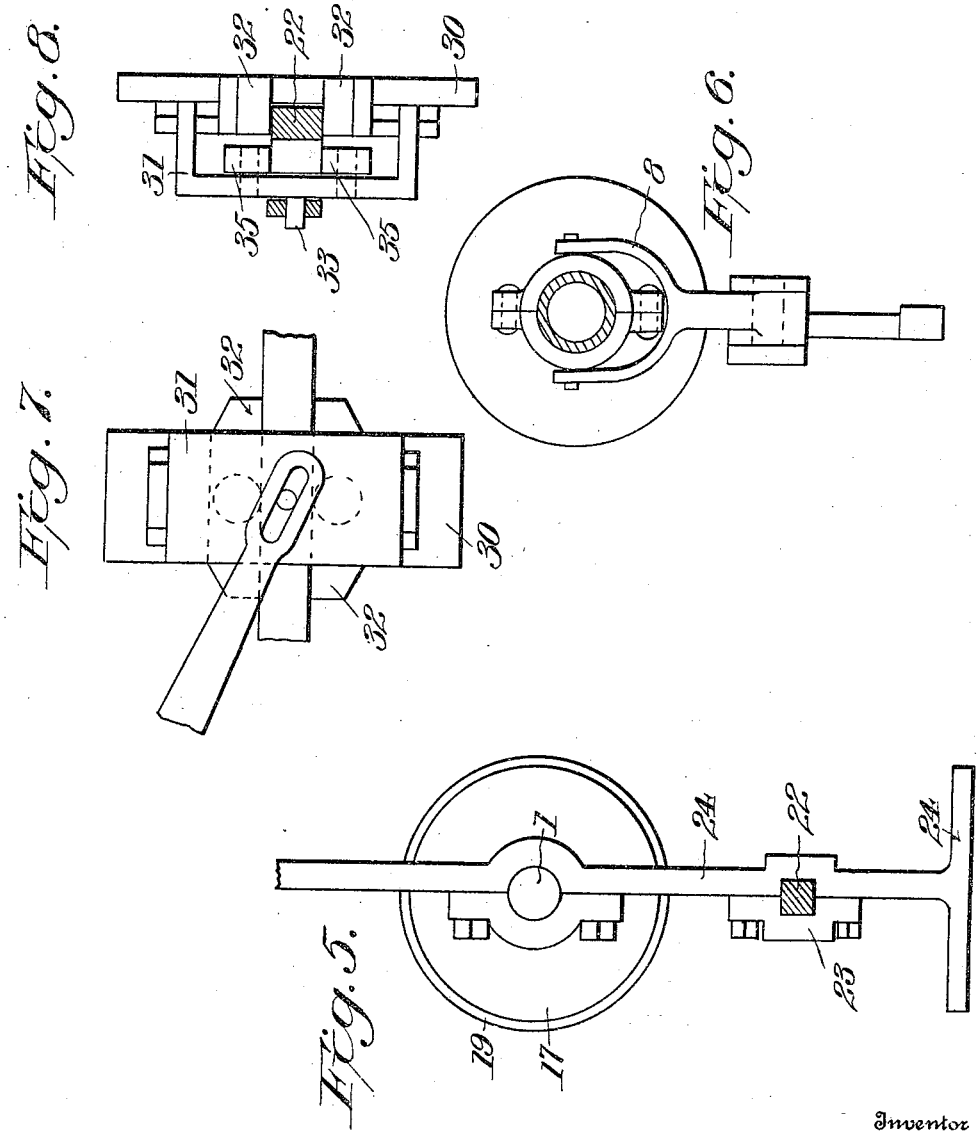

FRANK B. ALLEN, OF SALT LAKE CITY, UTAH.

CLUTCH-SHIFTING MECHANISM.

952,664.      Specification of Letters Patent.    Patented Mar. 22, 1910.

Application filed June 25, 1909. Serial No. 504,376.

*To all whom it may concern:*

Be it known that I, FRANK B. ALLEN, a citizen of the United States, residing at Salt Lake City, in the county of Salt Lake, State of Utah, have invented certain new and useful Improvements in Clutch-Shifting Mechanism, of which the following is a description, reference being had to the accompanying drawing and to the figures of reference marked thereon.

The invention relates to new and useful improvements in clutch shifting mechanism, and more especially to mechanism which is adapted for shifting a plurality of clutches in succession.

An object of the invention is to provide a clutch-shifting mechanism which shall be of few parts, and in which the clutches are shifted positively and in a predetermined order.

The invention consists in the parts, arrangements and improvements hereinafter shown, described and set forth in the appended claims.

In the drawings which show by way of illustration one embodiment of the invention, Figure 1 is a side view showing my improved clutch-shifting mechanism; Fig. 2 is an enlarged detail, showing the operation of the shifting cam; Fig. 3 is an enlarged detail showing the successive operation of the cams; Fig. 4 is a detail, showing the cam swung on its pivot; Fig. 5 is a detail end view of the supporting bracket; Fig. 6 is a detail showing the shifting lever; Fig. 7 is a detail in front view of the guiding member for operating the shifting lever; Fig. 8 is a side view of the same.

In the drawings, 1 is a shaft which may be either a driving shaft or a driven shaft, and said shaft has a plurality of gears. The gear 2 is preferably so connected as to give a reverse drive. The gear 3 is preferably of such size as to give the slow speed. The gears 2 and 3 are arranged in a pair, and are brought into operation by the clutch members 4 and 5, respectively.

The gears and clutch members are preferably of the type shown in my co-pending application, Serial No. 469,023, filed December 23rd, 1908, although it is obvious that if desired other forms of clutch members may be used.

As means for operating the clutch members, I have provided a shifting lever 6, which is pivoted at 7 to the supporting frame for the transmission mechanism. Said lever 6 is forked at its upper end, as at 8 in Fig. 6. The forked upper end of the lever 6 engages a shiftable sleeve 9, which if moved in one direction will operate the clutch 4 to connect the gear 2 to shaft 1, and if moved in the other direction it will operate the clutch 5 to connect the gear 3 to the shaft 1. I have also arranged on the shaft 1 a pair of gears 10 and 11, which are controlled by the clutch members 12 and 13 respectively. The clutch members 12 and 13 are operated by a lever 14 pivoted at 15 to the supporting frame for the transmission gear. I have also arranged on the shaft 1 a pair of gears 16 and 17. These gears 16 and 17 are controlled by the clutch members 18 and 19 respectively. A lever 20 pivoted at 21 operates the clutch members 18 and 19. The gears 10 and 11 are preferably of such size as to give an intermediate speed. The gear 16 as herein shown, is a high speed gear, while the gear 17 will give a speed intermediate the high speed, and the speed produced by the gear 11. As a means for shifting the clutches, I have provided a bar 22, which slides in suitable bearings 23, 23, formed in the frame 24, carrying the shaft 1. The bar 23 is reciprocated in its bearings by means of a lever 25, which is connected to the bar through the link 26. The lever 25 is pivoted at 27 and carries a latch 28 coöperating with a notched segment 29.

Mounted on the frame 24 as herein shown, are three brackets 30. Each bracket 30 carries a sliding member 31, which is connected thereto in any suitable way, so that it may slide vertically. The brackets 30 are also provided with laterally projecting guiding lugs 32. The controlling bar 22 slides between the lugs 32, and is held against any lateral movement. The sliding member 31 in one of the brackets has an outwardly projecting pin 33, which engages a slot 34 in the end of the lever 6, while the sliding members in the other brackets have similar pins which engage slots in the levers 14 and 20 respectively. It will readily be seen that if the sliding member 31 is raised or lowered, it will through the pin 33, oscillate the lever 6 on its pivotal support 7. The sliding member 31 is provided with a pair of rollers 35.

Pivoted to the controlling bar 22 at points 36 are controlling cams 37. The ends of the controlling cams 37 are inclined at 38, and said inclined ends normally seat against an inclined shoulder on the controlling bar 22. Leaf springs 40 are secured to the controlling bar 22 by screws 39, and at their free ends rest against the side faces of the cam members 37 and normally hold the same with the ends seated against the shoulders on the controlling bar. Each cam 37 has a laterally projecting cam face 41. The side of the cam member opposite the projecting face 41 is cut away as at 42. Each of the cam members 37 on the other side of its pivotal support 36, is provided with an oppositely projecting cam face 43, and with a cut-away portion 44. The cam face 43 has also a recess 45 forming a seat for the roller, which coöperates with the cams. The cam face 41 has a similar seat 46.

It will readily be seen that when the controlling bar 22 is moved back and forth, it will bring one cam after another into engagement with the sliding members controlling the levers for the clutches. When the latch 28 is in the notch 47, as shown in Fig. 1, the rollers 35 carried by the sliding member 31 in the left hand bracket, rest on the cam member 37 between the projecting cam faces, and the shifting collar 9 is located centrally between the clutches 4 and 5, and consequently is in neutral position. The levers 14 and 20 are also at this time in neutral position, so that all the gears are running free. If the latch 28 be released and shifted to the notch 48, the controlling bar will be moved to the right, carrying with it the cam member 37 and the cam face 41 of said cam member will engage the roller 35, moving the sliding member on which the roller is mounted. This will cause the lever 6 to be shifted, so as to operate the clutch member 4 and secure a backward drive.

When the latch is released and shifted to the notch 49, then the rollers 35 will leave the cam face 41, moving the lever 6 to a neutral position, and then sliding along the cam face 43 to the seat 45, shift the clutch 5 so as to connect the gear wheel 3 with the shaft 1. This will give the first speed. A shifting of the lever 25 so as to bring the latch 28 into the notch 50, will bring the cam face 41 of the right hand controlling cam 37 into coöperation with the rollers and the guiding member in the right hand bracket 30 and shift the lever 14 so as to operate the clutch 12. When the lever 25 is shifted to bring the latch into the notch 51, the parts are again in neutral position, and the clutch is free. The notch 52 will bring the clutch 13 into operation. The notch 53 will bring the clutch 19 into operation and the notch 54 will bring the clutch 18 into operation, giving the highest speed. In order that the cam 37 may yield to accommodate inaccuracy of parts and to allow the controlling bar to move through the brackets, the springs 39 have been provided, as above described. These springs will yield, allowing the controlling cams 37 to swing on their pivot, as clearly shown in Fig. 4. It will be evident that by the shifting of the bar longitudinally, first one clutch and then another will necessarily be brought into operation in succession, and it would be impossible to operate the high speed clutch, without first having connected up and operated the clutches of the intermediate speeds.

Having thus described my invention, what I claim as new and desire to secure by Letters Patent, is:—

1. A clutch-shifting mechanism including in combination, a plurality of clutches, a plurality of shiftable sleeves for operating the clutches, a lever for shifting each of said sleeves, a plurality of cams for operating said levers, and a common means for operating said cams, whereby said levers are moved one after the other to shift said clutches.

2. A clutch-shifting mechanism including in combination, a plurality of clutches, a plurality of shiftable sleeves for operating said clutches a reciprocating member, a plurality of cams carried thereby, a lever for each of said sleeves controlled by said cams, said cams being so disposed as to operate said levers in succession.

3. A clutch-shifting mechanism including in combination, a plurality of clutches, a reciprocating member, a plurality of yielding cams carried thereby, a plurality of levers for shifting said clutches, controlled by said cams, said cams being so disposed as to operate said levers in succession.

4. A clutch-shifting mechanism including in combination, a plurality of pairs of clutches, a single lever for each pair of clutches operating to control first one and then the other thereof, a reciprocating bar, a plurality of cam members carried by said bar, each of said cam members having oppositely disposed cam faces for operating successively upon the respective levers to shift the same first in one direction and then the other.

5. A clutch-shifting mechanism including in combination, a pair of clutches, a single lever operating first one and then the other of said clutches, a reciprocating bar, a cam member yieldingly connected to said bar and having oppositely disposed cam faces, first one and then the other of which is brought into operation with said lever.

6. A clutch-shifting mechanism including in combination, a shifting lever, a reciprocating bar, a sliding member connected to said lever and moving in a direction at right angles to said bar, and a cam carried by said bar for moving said sliding member.

7. A clutch-shifting mechanism including in combination, a shifting lever, a reciprocating bar, a sliding member connected to said lever and moving in a direction at right angles to said bar, a cam member carried by said bar and having oppositely disposed cam faces for moving said sliding member first in one direction and then the other.

8. A clutch-shifting mechanism including in combination, a shifting lever, a reciprocating bar, a sliding member connected to said lever and moving in a direction at right angles to said bar, a cam member yieldingly carried by said bar and having oppositely disposed cam faces for moving said sliding member first in one direction and then the other.

9. A clutch-shifting mechanism including in combination, a plurality of pairs of clutches, a shifting lever for each pair, a reciprocating bar, controlling cams carried by said bar and operating in succession upon said shifting levers for moving the same first in one direction and then the other.

10. A clutch-shifting mechanism including in combination, a plurality of pairs of clutches, a shifting lever for each pair, a reciprocating bar, a sliding member connected to each lever and moving in a direction at right angles to said bar, cam members carried by said bar and having oppositely disposed cam faces for moving said sliding members in succession first in one direction and then in the other.

11. A clutch-shifting mechanism including in combination, a plurality of pairs of clutches, a shifting lever for each pair, a reciprocating bar, a sliding member connected to each lever and moving in a direction at right angles to said bar, cam members pivoted to said bar, springs for holding said cam members in normal position, said cam members having oppositely disposed cam faces operating upon said sliding members for moving the same first in one direction and then in the other.

12. A clutch-shifting mechanism including in combination, a shifting lever, a sliding bar, a cam member pivoted to said sliding bar, seats formed on said bar against which said cam member normally rests, springs for holding said cam member against said seats, and means connected with said lever and coöperating with said cam member, whereby said lever is shifted by said cam member when said bar is reciprocated.

13. A clutch-shifting mechanism including in combination, a reciprocating member, a plurality of cams carried thereby, a plurality of clutch-shifting levers, sliding members connected with said levers, and rollers carried by said sliding members and coöperating with said cams, each of said cams having a recess to receive the roller, whereby the reciprocating member is held from accidental movement.

In testimony whereof I affix my signature, in presence of two witnesses.

FRANK B. ALLEN.

Witnesses:
   FRANK E. VICKERY,
   ETTA M. RESSEMAN.